US009208366B2

United States Patent
Liu

(10) Patent No.: US 9,208,366 B2
(45) Date of Patent: Dec. 8, 2015

(54) INDICIA DECODING DEVICE WITH SECURITY LOCK

(75) Inventor: Pengfei Liu, Suzhou (CN)

(73) Assignee: Metrologic Instruments, Inc., Blackwood, NJ (US)

(*) Notice: Subject to any disclaimer, the term of this patent is extended or adjusted under 35 U.S.C. 154(b) by 15 days.

(21) Appl. No.: 14/118,400

(22) PCT Filed: Jun. 8, 2011

(86) PCT No.: PCT/CN2011/000958
§ 371 (c)(1),
(2), (4) Date: Apr. 11, 2014

(87) PCT Pub. No.: WO2012/167400
PCT Pub. Date: Dec. 13, 2012

(65) Prior Publication Data
US 2014/0217180 A1 Aug. 7, 2014

(51) Int. Cl.
*G06K 7/10* (2006.01)
*E05B 73/00* (2006.01)

(52) U.S. Cl.
CPC ........ *G06K 7/10881* (2013.01); *E05B 73/0005* (2013.01); *E05B 73/0082* (2013.01); *G06K 2007/10524* (2013.01)

(58) Field of Classification Search
CPC ................ G06K 7/10881; G06K 2007/10524; E05B 73/0005; E05B 73/0082
See application file for complete search history.

(56) References Cited

U.S. PATENT DOCUMENTS

| 2004/0046027 A1* | 3/2004 | Leone et al. ............. 235/462.13 |
| 2008/0205878 A1* | 8/2008 | Owashi ....................... 396/429 |
| 2011/0121077 A1* | 5/2011 | Joseph et al. ............ 235/462.11 |
| 2012/0227448 A1* | 9/2012 | Su ................................... 70/58 |

* cited by examiner

*Primary Examiner* — Kristy A Haupt
(74) *Attorney, Agent, or Firm* — Additon, Higgins & Pendleton, P.A.

(57) ABSTRACT

A securable indicia encoding system with a lock receiving portion is disclosed herein. In one illustrative embodiment, a securable indicia decoding device may include an imaging subsystem, a memory, a processor, and a housing. The imaging subsystem may include an image sensor array and an imaging optics assembly operative for focusing an image onto the image sensor array. The memory may be capable of storing frames of image data comprising data communicated through the read-out portion of at least some of the pixels during the imaging operation. The processor may be operative for receiving one or more of the frames of image data from the data storage element and performing a decode operation for attempting to decode a decodable feature represented in at least one of the frames of image data. The housing may encapsulate the illumination subsystem and the imaging subsystem. The housing may include a lock receiving portion for receiving a security lock.

20 Claims, 4 Drawing Sheets

_US 9,208,366 B2_

INDICIA DECODING DEVICE WITH SECURITY LOCK

FIELD OF THE INVENTION

The present invention relates in general to mobile computing devices such as indicia decoding devices configured for imaging and decoding symbolic indicias.

BACKGROUND

Indicia decoding devices such as indicia reading terminals are available in a variety of types. An indicia reading terminal or barcode reading terminal can be operative to read decodable indicia such as barcodes. Indicia reading terminals for reading decodable indicia are available in multiple varieties. For example, indicia reading terminals are common in point of sale applications. Indicia reading terminals may have a keyboard and a display. In a keyboard and display equipped indicia reading terminal, a trigger button for actuating the output of decoded messages is typically provided in such locations as to enable actuation by a thumb of an operator. Some indicia reading terminals are adapted to read bar code symbols including one or more of one dimensional (1D) bar codes, stacked 1D bar codes, and two dimensional (2D) bar codes. Other indicia reading terminals are adapted to use optical character recognition (OCR) to read standard characters while still other indicia reading terminals are equipped to read both bar code symbols and OCR characters.

The discussion above is merely provided for general background information and is not intended to be used as an aid in determining the scope of the claimed subject matter.

SUMMARY

A securable indicia encoding system with a lock receiving portion is disclosed herein. In one illustrative embodiment, a securable indicia decoding device may include an imaging subsystem, a memory, a processor, and a housing. The imaging subsystem may include an image sensor array and an imaging optics assembly operative for focusing an image onto the image sensor array. The memory may be capable of storing frames of image data comprising data communicated through the read-out portion of at least some of the pixels during the imaging operation. The processor may be operative for receiving one or more of the frames of image data from the data storage element and performing a decode operation for attempting to decode a decodable feature represented in at least one of the frames of image data. The housing may encapsulate the illumination subsystem and the imaging subsystem. The housing may include a lock receiving portion for receiving a security lock. In another illustrative embodiment, a securable indicia decoding device system may include a securable indicia decoding device and a security lock. The securable indicia decoding device may include a housing that may include a lock receiving portion for receiving the security lock.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of various illustrative embodiments. In the drawings, like numerals are used to indicate like parts throughout the various views.

DETAILED DESCRIPTION OF ILLUSTRATIVE EMBODIMENTS

Figure 1:
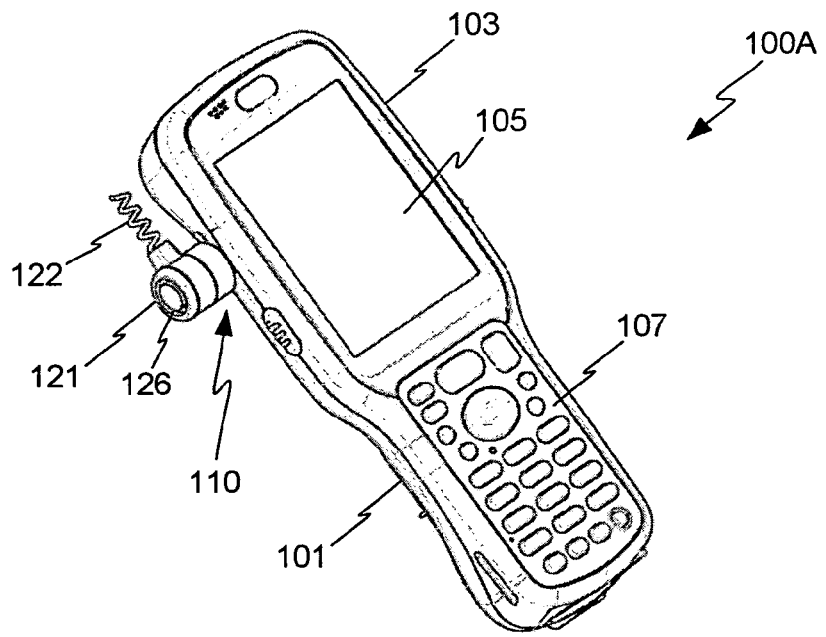
FIG. 1 depicts a perspective view of a securable indicia decoding device with a security lock attached, in accordance with an illustrative embodiment.

FIG. 1 depicts a perspective view of a securable indicia decoding device 100A, in accordance with an illustrative embodiment. In this example, securable indicia decoding device 100A includes a lower housing portion 101 and an upper housing portion 103 that conformingly fit together to form a complete housing. Securable indicia decoding device 100A also includes a monitor 105 and a keypad 107 both positioned on upper housing portion 103, as well as an imaging subsystem at the top of the device (not depicted here). Securable indicia decoding device 100A may also include an illumination subsystem, a decoding subsystem, and other elements and components that configure securable indicia decoding device 100A for imaging and decoding symbolic indicias, in various embodiments.

Securable indicia decoding device 100A also includes a security lock 121 secured to a lock receiving portion 110 positioned on one side of the lower housing portion 101. The security lock 121 has a flexible hardened tether 122 that may extend away from the body of the security lock 121 and that may be securely fastened to a fixed mount. Security lock 121 also has a keyway 126 for receiving a key for locking security lock 121 to securely fasten security lock 121 to indicia decoding device 100A, and for unlocking security lock 121 to enable security lock 121 to be released from securable indicia decoding device 100A. Security lock 121 is fastened to a lock receiving portion 110 of lower housing portion 101, as depicted in the subsequent figures and as described below. The position of lock receiving portion 110 is generally indicated in lower housing portion 101, although the structure of lock receiving portion 110 is obscured by security lock 121 in the view depicted in FIG. 1.

Figure 2:
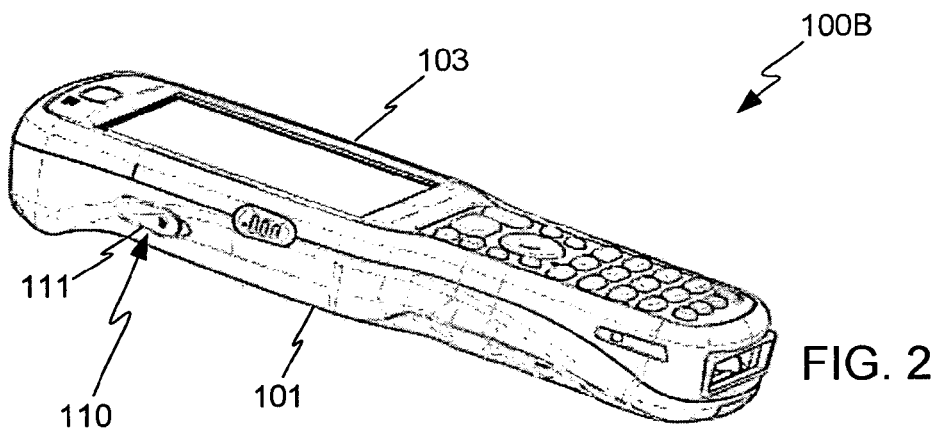
FIG. 2 depicts a perspective view of a securable indicia decoding device configured with a lock receiving portion to have a security lock attached to it, in accordance with an illustrative embodiment.

FIG. 2 depicts a perspective view of securable indicia decoding device 100B comprising a lock receiving portion 110 and configured to have a security lock attached to it, in accordance with an illustrative embodiment consistent with that of FIG. 1. Securable indicia decoding device 100B may be identical to the securable indicia decoding device 100A depicted in FIG. 1 in this illustrative example except that it does not have security lock 121 attached to it. As can be seen in FIG. 2, securable indicia decoding device 100B includes a lock receiving portion 110 that includes a seal plug 111 in lower housing portion 101, in this illustrative embodiment. Lock receiving portion 110 also includes a lock receiving slot 113 that is covered and obscured from view by seal plug 111 in the view depicted in FIG. 2. Lower housing portion 101 and upper housing portion 103 are securely mated together to form a complete housing around securable indicia decoding device 100B.

Figure 3:
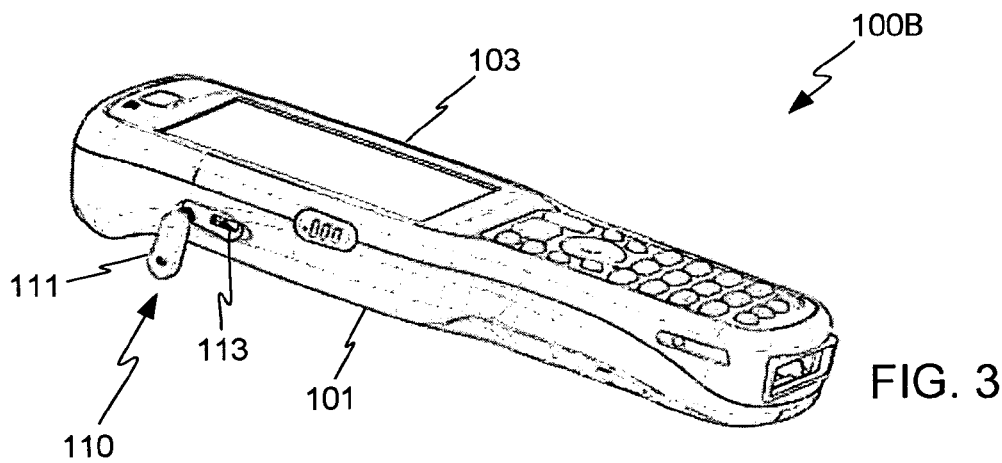
FIG. 3 depicts a perspective view of a securable indicia decoding device configured with a lock receiving portion to have a security lock attached to it, in accordance with an illustrative embodiment.

FIG. 3 also depicts a perspective view of securable indicia decoding device 100B comprising a lock receiving portion 110 and configured to have a security lock attached to it, in accordance with an illustrative embodiment consistent with that of FIG. 2, but with seal plug 111 pulled out and rotated away from the lock receiving portion 110 of lower housing portion 101. This lock receiving portion 110 also includes a lock receiving slot 113 that is exposed when seal plug 111 is pulled out and rotated away from the lock receiving portion 110 of lower housing portion 101, and which may be covered when seal plug 111 is rotated into place and fitted into lock receiving slot 113, as is depicted in FIG. 2.

Figure 4:
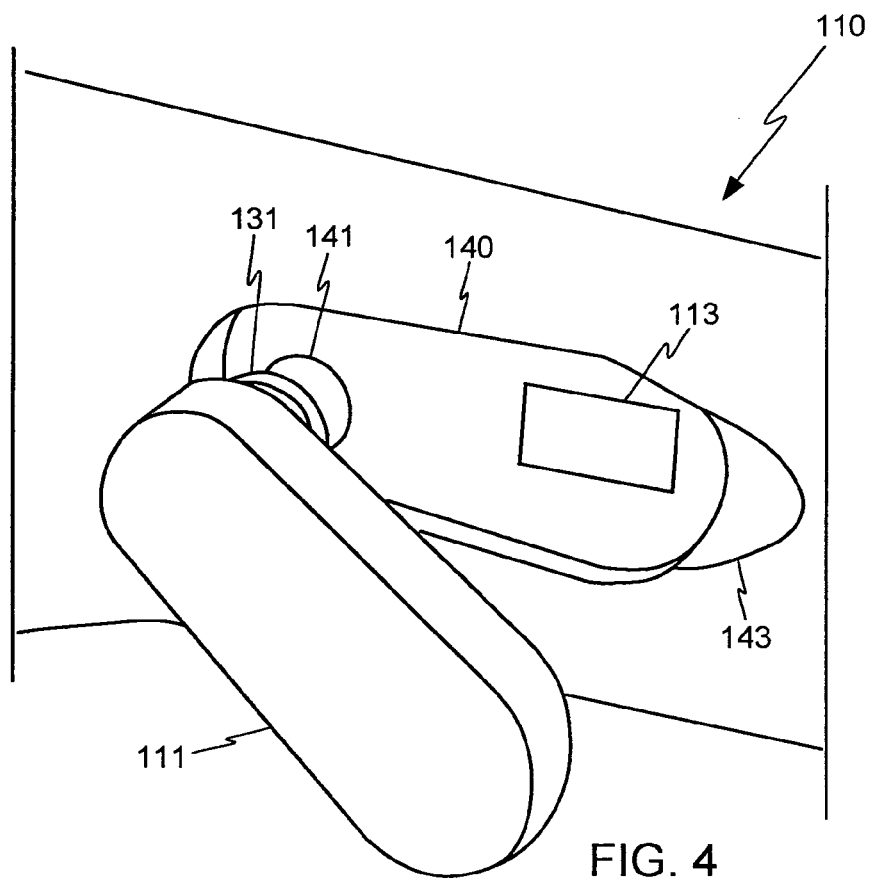
FIG. 4 depicts a detailed perspective view of a lock receiving portion of a securable indicia decoding device, in accordance with an illustrative embodiment.
Figure 5:
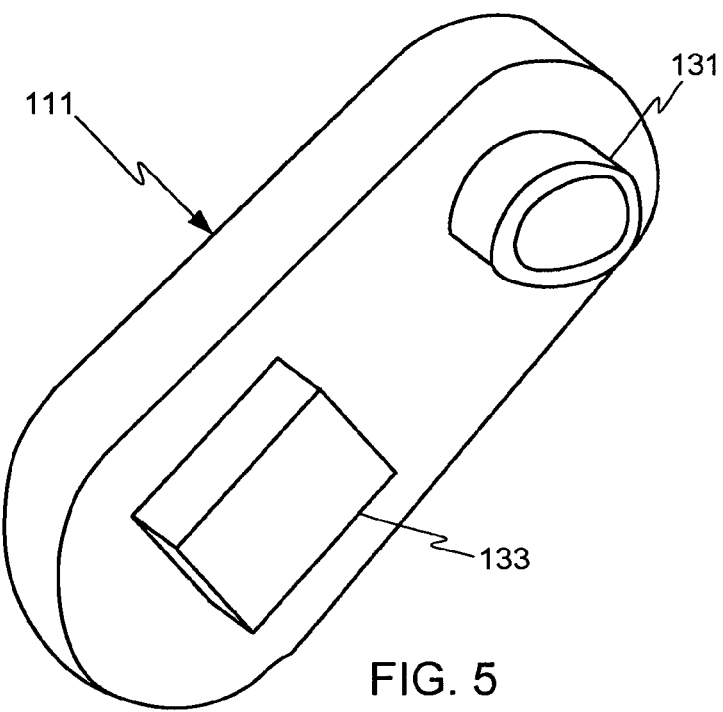
FIG. 5 depicts a detailed perspective view of a seal plug comprised in a lock receiving portion of a securable indicia decoding device, in accordance with an illustrative embodiment.

FIG. 4 and FIG. 5 depict closer detail of various elements of lock receiving portion 110. As shown in FIG. 2 and seen in better detail in FIG. 4, lock receiving portion 110 includes a depression 140 on the side of the lower housing portion 101, with the lock receiving slot 113 positioned in the depression 140. FIG. 5 shows seal plug 111 detached from lock receiving portion 110, to show the face of seal plug 111 that faces toward depression 140 and lock receiving slot 113. As shown in FIG. 5, seal plug 111 may include a protruding nub 133 that is shaped to fit conformingly within the lock receiving slot 113 when seal plug 111 is in the plugged position over lock receiving portion 110, in this illustrative embodiment. Seal plug 111 may also include a root 131 that conformingly fits around a small cylindrical base 141 positioned in the depression 140 across from lock receiving slot 113, thereby allowing seal plug 111 to be alternately pulled away from the depression 140 and rotated out of the way of lock receiving slot 113, and pushed back into the depression 140 and with protruding nub 133 pushed back into lock receiving slot 113. Seal plug 111 is therefore retractably and rotatingly mounted in the depression 140, in this illustrative embodiment. Seal plug 111 is also therefore configured to alternately fit conformingly over the lock receiving slot 113, and to be extended and rotated out of the way of the lock receiving slot 113, in this illustrative embodiment.

Seal plug 111 may thereby keep lock receiving slot 113 clean and protected during times when securable indicia decoding device 100B is used or kept without a security lock 121 attached thereto, for example. Seal plug 111 may also ensure that housing 100A/100B remains waterproof. In particular, housing 100A/100B with lock receiving portion 110 and seal plug 111 may qualify for the IP54 rating, standardized by the U.S. National Electrical Manufacturers Association (NEMA), for water resistance and other environmental endurance factors. Lock receiving portion 110 may also include a dimple 143 on the side of lower housing portion 101 adjacent to the depression 140. When a user intends to pull the seal plug 111 out from the depression 140, the user may position her finger or fingernail within dimple 143 to gain traction more easily on the side of seal plug 111, for example.

Figure 6:
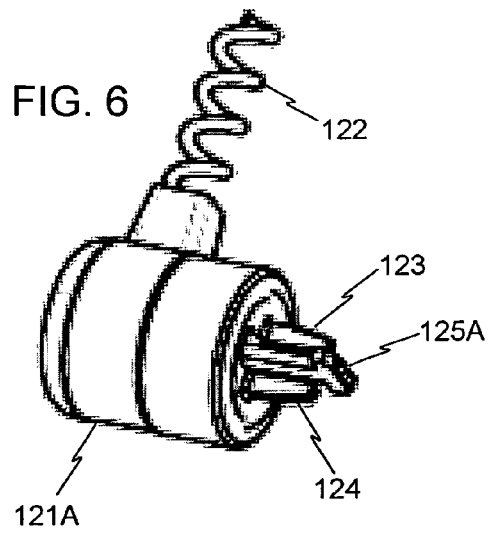
FIG. 6 depicts a perspective view of a security lock configured to be attached to a securable indicia decoding device, in accordance with an illustrative embodiment.
Figure 7:
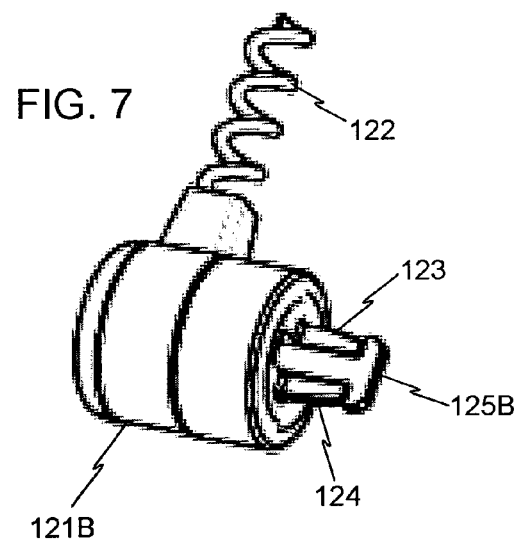
FIG. 7 depicts a perspective view of a security lock configured to be attached to a securable indicia decoding device, in accordance with an illustrative embodiment.

FIG. 6 depicts a perspective view of a security lock 121A configured to be attached to a securable indicia decoding device 100A/100B, in accordance with an illustrative embodiment that is consistent with security lock 121 as depicted in FIG. 1. FIG. 7 depicts a perspective view of security lock 121B configured to be attached to an indicia decoding device 100A/100B, in accordance with an illustrative embodiment consistent with that of FIG. 6. Security lock 121A in FIG. 6 and security lock 121B in FIG. 7 may both be identical to security lock 121 as in the illustrative example of FIG. 1, where security lock 121A shows the security lock 121 in a locked state, and security lock 121B shows the security lock 121 in an unlocked state. Security lock 121A/121B may be collectively referred to below as security lock 121 in discussing elements or aspects thereof that don't depend on whether security lock 121 is in a locked or unlocked state.

In particular, security lock 121 includes side braces 123 and 124, and a T-shaped locking beam 125 extending between and beyond side braces 123 and 124. Locking beam 125 is labeled 125A in FIG. 6 depicted locking beam 125 in the locked state, while locking beam 125 is labeled 125B in FIG. 7 depicted locking beam 125 in the unlocked state. Locking beam 125 may be rotated between the locked state and the unlocked state by means of rotating a key mated to security lock 121 in the keyway 126 thereof. Lock receiving slot 113 is shaped to allow passage of the T-shaped locking beam 125 and the side braces 123 and 124 through lock receiving slot 113, in this illustrative embodiment. Lock receiving slot 113 may be shaped to allow passage of various other types or forms of security lock portions through lock receiving slot 113, in various other embodiments.

Figure 8:
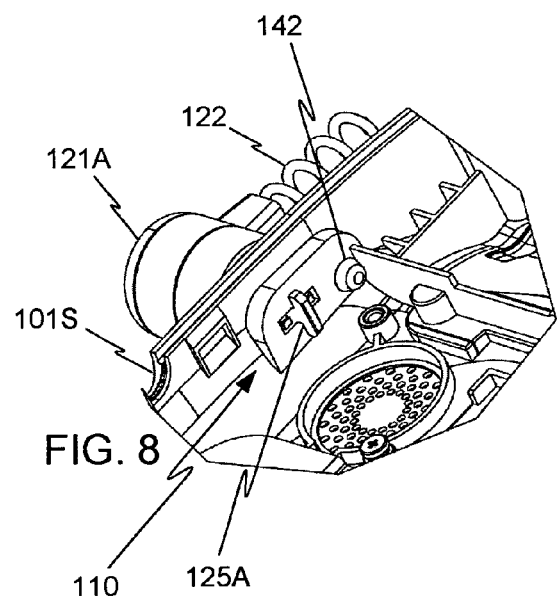
FIG. 8 depicts a perspective view of a detailed portion of a lower housing portion of a securable indicia decoding device with a security lock attached to a lock receiving portion of the lower housing portion, in accordance with an illustrative embodiment.
Figure 9:
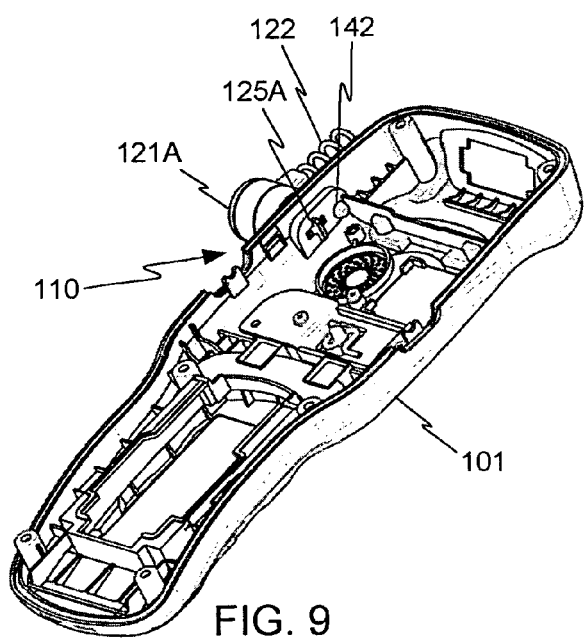
FIG. 9 depicts a perspective view of a lower housing portion of a securable indicia decoding device with a security lock attached to a lock receiving portion of the lower housing portion, in accordance with an illustrative embodiment.

FIG. 8 depicts a perspective view of a detailed portion 101S of a lower housing portion of an indicia decoding device with a security lock 121A attached and locked in place, in accordance with an illustrative embodiment. FIG. 9 depicts a perspective view of a lower housing portion 101 of an indicia decoding device with a security lock 121A attached, in accordance with an illustrative embodiment consistent with that of FIG. 8, and showing the larger context of the detailed portion 101S of lower housing portion 101. As seen in FIGS. 8 and 9, when security lock 121 is fixed to the lock receiving portion 110 of lower housing portion 101 of a securable indicia decoding device 100A/100B, locking beam 125A may be rotated into a locking position. In this locking position, the opposing ends of the locking beam 125A extend substantially orthogonally away from the lock receiving slot 113 in the interior of lower housing portion 101 and are positioned adjacent the side walls on either side of lock receiving slot 113, thereby resisting being pulled out through lock receiving slot 113, in this illustrative example. Side braces 123 and 124 as seen in FIGS. 5 and 6 may brace the base of locking beam 125A within lock receiving slot 113, promoting a securely fitting interface of these elements of security lock 121A with lock receiving slot 113. A key may be used within the keyway 126 of security lock 121A to rotate locking beam 125A/125B to the unlocked state as seen in FIG. 7. When the locking beam 125B is in this unlocked state, locking beam 125B may slide freely through lock receiving slot 113 and out from the interior of interior housing portion 101, enabling the disconnection of security lock 121B from the indicia decoding device 100A/100B, in this illustrative example. As also seen in FIGS. 8 and 9, lock receiving portion 110 also includes seal plug anchor 142, which is integrally formed with the small cylindrical base 141 as seen in FIG. 4, for holding the seal plug 111 securely in place.

Various security locks may have different types and different dimensions in other embodiments. For example, the security lock may be in any location on the housing or other appropriate exterior surface on different indicia decoding devices, in various embodiments. This may include any location on either the upper housing portion 103 or the lower housing portion 101, including the front, back, left side, right side, top, or bottom, and may include positions on a housing that is integral and unitary or that otherwise includes components other than an upper housing portion and a lower housing portion, for example. The security lock may also have any of a wide variety of dimensions, in various embodiments. Also, while one particular illustrative example of a locking mechanism is illustrated in FIGS. 6 through 9, any of a wide variety of other mechanical locking mechanisms may also be used in other embodiments. Various embodiments may also include any of a wide variety of other types of locking mechanisms, that may include electrical, electronic, magnetic, and/or other means, for example. A security lock may also include any of a wide variety of other types of anti-theft mechanisms, in various embodiments.

An indicia decoding device with a security lock of any embodiment as disclosed herein, such as the illustrative embodiment of securable indicia decoding device 100A/100B with a security lock 121A/121B, may be used in any of a variety of contexts. For example, a securable indicia decoding device 100A/100B may be intended for more or less long-term usage in a fixed location, and security lock 121A/121B may enable securable indicia decoding device 100A/100B to be securely fixed via a tether 122 to a stationary anchor or other base.

As noted above, securable indicia decoding device 100A/100B may also include an illumination subsystem, a decoding subsystem, and other elements and components that configure securable indicia decoding device 100A/100B for imaging and decoding symbolic indicias, in various embodiments. An illustrative example of a securable indicia decoding device 100C is depicted in block diagram form in FIG. 10.

Figure 10:
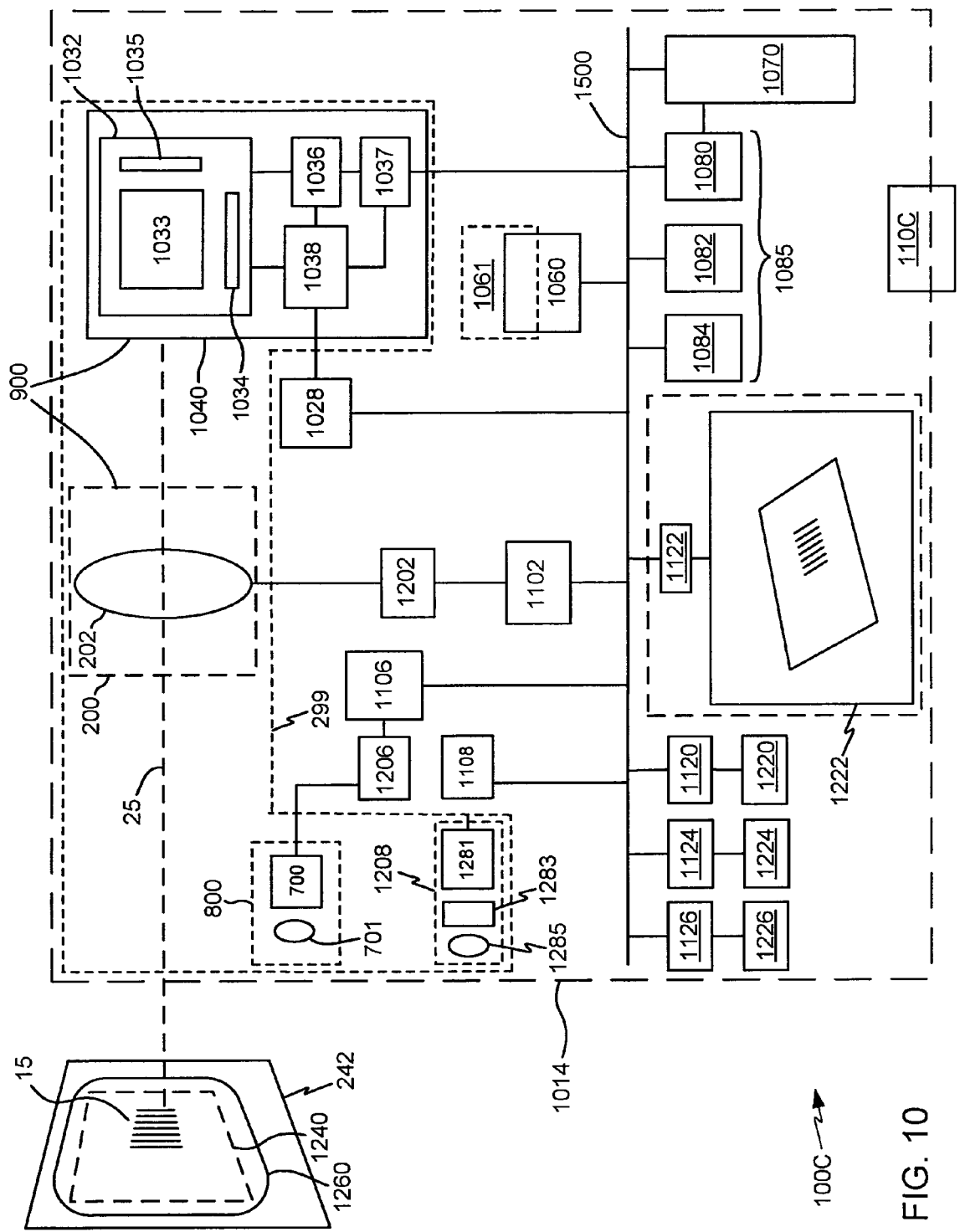
FIG. 10 depicts a block diagram of a securable indicia reading device, in accordance with an illustrative embodiment.

Securable indicia reading device 100C in the illustrative embodiment depicted in FIG. 10 is consistent with securable indicia decoding device 100A/100B as shown in FIGS. 1-3 and the features of securable indicia decoding device 100A/100B depicted in FIGS. 8 and 9. Referring to FIG. 10, there is set forth herein a novel securable indicia decoding device 100C having an imaging module 299, a hand held housing 1014, a memory 1085, and a processor 1060, and a lock receiving portion 110C. Imaging module 299 includes an imaging illumination subsystem 800, an aimer subsystem 1208, and an imaging subsystem 900. Imaging illumination subsystem 800 may be operative for projecting an illumination pattern 1260. Imaging subsystem 900 may include an image sensor array 1033 and an imaging optics assembly 200 operative for focusing an image onto the image sensor array 1033. Hand held housing 1014 encapsulates imaging illumination subsystem 800 and imaging subsystem 900, in this illustrative embodiment. Memory 1085 is capable of storing one or more frames of image data, in which the frames of image data may represent light incident on image sensor array 1033. Processor 1060 is operative for addressing memory 1085 and processing the frames of image data, such as processing for attempting to decode decodable indicias represented in the image data. Securable indicia reading device 100C includes decoding subsystem 1061 which may be partly or wholly included on processor 1060 and may also include or be comprised in other processing elements, memory elements, or other elements elsewhere in securable indicia reading device 100C, and may include hardware and/or software elements that work to process the image data to identify and decode decodable indicias represented in the image data. Processor 1060 may be decoding subsystem 1061, or may comprise decoding subsystem 1061, or may be comprised in decoding subsystem 1061, in different embodiments. In any of these cases, processor 1060 may be operative for receiving one or more of the frames of image data from memory 1085 or another memory element and performing a decode operation for attempting to decode a decodable feature represented in at least one of the frames of image data, for example. Securable indicia reading device 100C also includes lock receiving portion 110C, which is positioned in hand held housing 1014 and is configured for receiving a security lock, such as is described above with reference to FIGS. 1-9.

In the illustrative embodiment of FIG. 10, securable indicia decoding device 100C includes user interface elements including trigger 1220, display screen 1222, pointer mechanism 1224, and keypad 1226, which may be disposed on a common side of hand held housing 1014, analogous to how monitor 105 and keypad 107 are disposed on upper housing portion 103 of securable indicia decoding device 100A in FIG. 1. Display screen 1222 in one illustrative embodiment may incorporate a touch panel for navigation and virtual actuator selection, so that display screen 1222 may serve as both user input device and user output device of securable indicia decoding device 100C. Various embodiments of securable indicia decoding device 100C may also include other keys, a slide-out or fixed keyboard, a trigger, and/or other user input/output components, for example.

FIG. 10 depicts imaging subsystem 299 of securable indicia decoding device 100C being used to image a target 110 having a decodable feature 15. Imaging subsystem 299 includes an illumination subsystem 800 that projects illumination pattern 1260 to surround field of view 1240, in this illustrative embodiment. Securable indicia decoding device 100C may include an imaging illumination subsystem 800 for illumination of a target, such as substrate 242, as in FIG. 1, and for projection of an illumination pattern 1260. Illumination pattern 1260, in the embodiment shown, may be projected to be proximate to but larger than an area defined by field of view 1240, but may also be projected in an area smaller than an area defined by a field of view 1240. Securable indicia decoding device 100C may capture a stream of image frames of the field of view 1240 of imaging subsystem 299, and use decoding subsystem 1061 to process the image frames for performing an attempted decode of decodable feature 15. Securable indicia decoding device 100C may therefore be operative both for capturing and displaying targets and decodable features, and for performing decodes of the decodable features and acquiring the information they represent.

Securable indicia decoding device 100C may include aimer subsystem 1208 coupled to system bus 1500 via interface 1108. As shown in FIG. 10, aimer subsystem 1208 may illustratively include an aimer light source 1281 and aimer optical elements 1283 and 1285. For example, aimer light source 1281 may include one or more light emitting diodes (LEDs) and/or aiming lasers, while aimer optical elements may include one or more apertures 1283, and one or more lenses 1285, which may be a spherical lens, an aspheric lens, a cylindrical lens, or an animorphic lens, for example. Aimer subsystem 1208 projects light from aimer light source 1281 through aperture 1283 and optics 1285 to provide an aiming pattern onto a target to assist in capturing an image of the target with image sensor array 1033. The aimer light source 1281 may project light forward into a hemispherical pattern, for example. The front surface of an LED light source may contain an integrated convex lens surface designed to reduce the angular divergence of the light leaving the LED. As much of this light as possible is directed through the aimer aperture 1283 and directed to further pass through the aimer optics 1285. The aimer optics 1285 may be designed to create an image of the aimer aperture on the indicia located on the target, such as substrate 242. Aimer subsystem 1208 may in another implementation include a laser and a laser collimator, for example.

In various illustrative embodiments, imaging illumination subsystem 800 may include an imaging illumination light source assembly 700 that may include one or more light sources, according to various illustrative embodiments. Imaging illumination light source assembly 700 may further include one or more light source banks, each comprising one or more light sources, for example. Such light sources may illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

In various illustrative embodiments, imaging illumination subsystem 800 may include an imaging illumination optical assembly 701. Imaging illumination optical assembly 701, or other parts of imaging illumination subsystem 800, may include any of a variety of optical elements such as one or more lenses, one or more diffusers, one or more mirrors, and/or one or more prisms, as illustrative examples. Imaging illumination optical assembly 701 may thereby focus, diffuse, shape, or otherwise project illumination toward a target area. Imaging illumination subsystem 800 may thereby project an illumination pattern toward or onto a target area. An illumination pattern thus projected may include any type or pattern of illumination in different embodiments.

In use, securable indicia decoding device 100C may be oriented by an operator with respect to a substrate 242 (such as a piece of paper, a package, or any other type of substrate) bearing decodable indicia 15 in such manner that illumination pattern 1260 is projected on a decodable indicia 15. In the illustrative example of FIGS. 1 and 2, decodable indicia 15 is provided by a one dimensional (1D) bar code symbol. Decodable indicia 15 may take the form of a 1D bar code symbol, a 2D bar code symbol, optical character recognition (OCR) characters, or other types of decodable indicias in various illustrative embodiments.

Referring to further aspects of securable indicia decoding device 100C, imaging optics assembly 200 may be controlled with use of electrical power input unit 1202 which provides energy for changing a plane of optimum focus of imaging optics assembly 200. In one embodiment, an electrical power input unit 1202 may operate as a controlled voltage source, and in another embodiment, as a controlled current source. Illumination subsystem light source assembly 700 may be controlled with use of light source control circuit 1206. Electrical power input unit 1202 may apply signals for changing optical characteristics of imaging optics assembly 200, e.g., for changing a focal length and/or a best focus distance of (a plane of optimum focus of) imaging optics assembly 200. Light source control circuit 1206 may send signals to illumination pattern light source assembly 700, e.g., for changing a level of illumination output by illumination pattern light source assembly 700.

Various embodiments for lens assemblies for use as imaging optics assembly 200 are described further as follows. In the embodiment of FIG. 3, imaging optics assembly 200 may comprise a fluid lens 202. Fluid lens 202 in one embodiment may be an electrowetting fluid lens comprising a plurality of immiscible optical fluids. Fluid lens 202 in one embodiment may be provided by an ARCTIC 314 or ARCTIC 316 fluid lens of the type available from VARIOPTIC S.A. of Lyon, France. Fluid lens 202 may alternatively be a fluid lens of the type having a deformable surface, and may be provided in association with a mechanical actuator assembly (not shown) coupled to power input unit 1202. Various other types of lenses and/or other optical elements may also be included in imaging optics assembly 200, in various other embodiments.

Securable indicia decoding device 100C may also include a number of peripheral devices such as trigger 1220 which may be used to make active a trigger signal for activating frame readout and/or certain decoding processes. Securable indicia decoding device 100C may be adapted so that activation of trigger 1220 activates a trigger signal and initiates a decode attempt. Specifically, securable indicia decoding device 100C may be operative so that in response to activation of a trigger signal, a succession of frames may be read-out and captured by way of read-out of image information from image sensor array 1033 (typically in the form of analog signals) and then storage of the image information after conversion into memory 1080 (which may buffer one or more of the succession of frames at a given time). Processor 1060 may be operative to subject one or more of the succession of frames to a decode attempt.

For attempting to decode a bar code symbol, e.g., a one dimensional bar code symbol, processor 1060 may process image data of a frame corresponding to a line of pixel positions (e.g., a row, a column, or a diagonal set of pixel positions) to determine a spatial pattern of dark and light cells and may convert each light and dark cell pattern determined into a character or character string via table lookup. Where a decodable indicia representation is a 2D bar code symbology, a decode attempt may comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup, as an illustrative example. In other illustrative examples, the characters may be translated and scaled for feature extraction and subjected to a pattern recognition algorithm, or use other pattern recognition techniques, for instance.

Decoding subsystem 1061 may recognize the representational format of decodable feature 15, such as recognizing that decodable feature 15 is a one-dimensional barcode in the example depicted in FIG. 10 and applying one-dimensional barcode decoding processing to the one-dimensional barcode acquired from the image data. Decoding subsystem 1061 may also be configured to recognize any of a wide variety of other types of decodeable symbols such as alphabetic letters representing words in the English language, and apply one or more optical character recognition (OCR) processes to acquire the words represented in the text. Other decoding processes may be applied to other forms of decodable features, such as barcode decoding algorithms to an image of a two-dimensional barcode, or a document capture program for scanning and saving a document, for example. Other decodable features may include any type of writing written in any language in any type of characters; numbers, equations, one or two dimensional barcodes of any format or standard, or any other kind of representational symbol, for example. Decoding subsystem 1061 may be configured to identify and decode target data in any of a further variety of one and two-dimensional bar codes and other symbolic coding protocols such as UPC/EAN, Code 11, Code 39, Code 128, Codabar, Interleaved 2 of 5, MSI, PDF417, MicroPDF417, Code 16K, Code 49, MaxiCode, Aztec, Aztec Mesa, Data Matrix, Qcode, QR Code, UCC Composite, Snowflake, Vericode, Dataglyphs, RSS, BC 412, Code 93, Codablock, Postnet (US), BPO4 State, Canadian 4 State, Japanese Post, KIX (Dutch Post), Planet Code, OCR A, OCR B, and any other type or protocol for decodable features. In various embodiments, the decoder module may also include autodiscrimination functionality that allows it to automatically discriminate between a plurality of barcodes such as those listed above, a plurality of written human languages, a plurality of computer programming languages, mathematical notations, and other decodable features.

Securable indicia decoding device 100C may also render an output on display screen 1222 that displays output text or other information decoded from or that represents or is based on the information decoded by decoding subsystem 1061 from the decodable feature 15. The decoded information produced by the successful decode of decodable features may also be provided in any other format of output, such as a text translation into another language, a text-to-speech audio output, or a transmission to another device, a network node, or another computing environment resource, for example. Securable indicia decoding device 100C or other securable indicia decoding device embodiments may include any of a wide variety of output components for providing any form of output. Such output components may include display screen 1222, monitor 105 of Securable indicia decoding device 100C as shown in FIG. 1, an audio output component, any type of wireless or hard-wire transmission component, or any other type of output element for providing, in any format, decoded information as decoded by decoding subsystem 1061, in various embodiments.

The illustrative embodiment of securable indicia decoding device 100C as depicted in FIG. 3 illustrates various additional hardware platform features for support of operations described herein, according to a variety of illustrative embodiments. For example, processor 1060 may illustratively be or include a central processing unit (CPU) in the embodiment of securable indicia decoding device 100C. Processor 1060 may illustratively be or include a complex programmable logic device (CPLD), an application-specific integrated circuit (ASIC), a field programmable gate array (FPGA), or any type of circuit capable of processing logic operations, in accordance with various embodiments. Decoding subsystem 1061 may include processor 1060 or parts thereof as well as elements of software being executed thereby. Decoding subsystem 1061 may also include additional processing elements or other elements that may be distributed in different portions of securable indicia decoding device 100C and working together with processor 1060.

In an illustrative embodiment, elements of an imaging illumination subsystem 800 and an imaging subsystem 900 may be incorporated into an imaging module 299, as illustratively depicted in FIGS. 1, 2, and 3. Imaging module 299 may include a printed circuit board carrying an image sensor integrated circuit 1040 having an image sensor array 1033, for example. Exemplary imaging module 299 may also include an imaging optics assembly 200 supported by a support assembly, for example. An imaging subsystem 900 fully or partially comprised in imaging module 299 can comprise an image sensor array 1033 which can be integrated onto image sensor integrated circuit 1040 in combination with imaging optics assembly 200.

Securable indicia decoding device 100C may include an image sensor 1032 comprising a multiple pixel image sensor array 1033 having pixels arranged in rows and columns of pixels, associated column circuitry 1034 and row circuitry 1035. Associated with the image sensor 1032 may be amplifier circuitry 1036 (amplifier), and an analog to digital converter 1037 which converts image information in the form of analog signals read-out of image sensor array 1033 into image information in the form of digital signals. Image sensor 1032 may also have an associated timing and control circuit 1038 for use in controlling e.g., the exposure period of image sensor 1032, gain applied to the amplifier 1036. The noted circuit components 1032, 1036, 1037, and 1038 may be packaged into a common image sensor integrated circuit 1040, for example. Image sensor integrated circuit 1040 may also incorporate fewer than the noted number of components, in various embodiments.

In the course of operation of securable indicia decoding device 100C, image signals may be read-out of image sensor 1032, converted, and stored into memory 1085 illustratively including RAM 1080. A memory 1085 of securable indicia decoding device 100C may include RAM 1080, a nonvolatile memory such as EPROM 1082 and a storage memory device 1084 such as may be provided by a flash memory or a hard drive memory, and/or various other types of memory components in various embodiments. In one embodiment, processor 1060 may be adapted to read-out image data stored in memory 1080 and subject such image data to various image processing algorithms. Securable indicia decoding device 100C may include a direct memory access unit (DMA) 1070 for routing image information read-out from image sensor 1032 that has been subject to conversion to RAM 1080. In another embodiment, securable indicia decoding device 100C may employ a system bus providing for bus arbitration mechanism (e.g., a PCI bus) thus eliminating the need for a central DMA controller. Various memory elements and/or various processing elements may be used in any of a variety of locations in the architecture of securable indicia decoding device 100C, and a wide variety of other embodiments of system bus architecture and/or direct memory access components may provide for efficient data transfer between the image sensor 1032 and RAM 1080 in various embodiments.

Imaging optics assembly 200 may be adapted for focusing an image of a decodable indicia 15 located within a field of view 1240 on a substrate 242, onto image sensor array 1033. A size in paper space of a field of view 1240 of securable indicia decoding device 100C may be varied in a number of alternative ways. A size in target space of a field of view 1240 may be varied e.g. by changing the distance between securable indicia decoding device 100C and decodable indicia 15, changing an imaging lens setting in imaging optics assembly 200, or changing a number of pixels of image sensor array 1033 that are subject to read-out, for example. Imaging light rays may be transmitted about imaging axis 25. Imaging optics assembly 200 may be adapted to be capable of multiple focal lengths and multiple planes of optical focus (best focus distances).

Securable indicia decoding device 100C may include various interface circuits for coupling various of the peripheral devices to system address/data bus (system bus) 1500, for communication with processor 1060 also coupled to system bus 1500. Securable indicia decoding device 100C may include interface circuit 1028 for coupling image sensor timing and control circuit 1038 to system bus 1500, interface circuit 1102 for coupling electrical power input unit 1202 to system bus 1500, interface circuit 1106 for coupling illumination light source bank control circuit 1206 to system bus 1500, and interface circuit 1120 for coupling trigger 1220 to system bus 1500. Securable indicia decoding device 100C may also include a display 1222 coupled to system bus 1500 and in communication with processor 1060, via interface 1122, as well as pointer mechanism 1224 in communication with processor 1060 via interface 1124 connected to system bus 1500.

A succession of frames of image data that may be captured and subject to the described processing may be full frames (including pixel values corresponding to each pixel of image sensor array 1033 or a maximum number of pixels read-out from array 1033 during operation of securable indicia decoding device 100C). A succession of frames of image data that may be captured and subject to the described processing may also be "windowed frames" comprising pixel values corresponding to less than a full frame of pixels of image sensor array 1033. A succession of frames of image data that may be captured and subject to the described processing may also comprise a combination of full frames and windowed frames.

A full frame may be captured by selectively addressing for read-out pixels of image sensor 1032 having image sensor array 1033 corresponding to the full frame. A windowed frame may be captured by selectively addressing for read-out pixels of image sensor 1032 having image sensor array 1033 corresponding to the windowed frame. In one embodiment, a number of pixels subject to addressing and read-out determine a picture size of a frame. Accordingly, a full frame may be regarded as having a first relatively larger picture size and a windowed frame may be regarded as having a relatively smaller picture size relative to a picture size of a full frame. A picture size of a windowed frame may vary depending on the number of pixels subject to addressing and readout for capture of a windowed frame. For example, securable indicia decoding device 100C may be mounted to or positioned on a machine or other mount where numerous articles are repeatedly placed in the imaging target area of the securable indicia decoding device 100C with machine-readable indicia or other decodable features that are positioned in a predictably repeatable position in the imaging target area of the securable indicia decoding device 100C. In a case such as this, the securable indicia decoding device 100C or a processor thereof such as processor 1060 may be programmed to only address the pixels covering this predictable position within the imaging area on each of a series of imaging targets, and then only download and perform a decoding process on this windowed portion of pixels selected from the full imaging array. In another example, securable indicia decoding device 100C may take one or more full initial images and subject them to a preprocessing step for just detecting and locating any candidate decodable features in an imaging area, select the section or sections of the imaging target area that are defined by candidate decodable features, and then only download or read imaging data from that selected imaging target area or those selected imaging target areas for subsequent full image processing for performing attempted decode operations on the candidate decodable features. Selecting such windowed imaging areas may help to increase the rate of imaging and downloading and processing the image data from the targets of interest, and may help reduce processing burden and power consumption in securable indicia decoding device 100C.

Securable indicia decoding device 100C may capture frames of image data at a rate known as a frame rate. An illustrative frame rate may be 60 frames per second (FPS) which translates to a frame time (frame period) of 16.6 milliseconds (ms), in an illustrative embodiment. Another illustrative frame rate may be 30 frames per second (FPS) which translates to a frame time (frame period) of 33.3 ms per frame, in an illustrative embodiment. In another illustrative embodiment, a frame rate of 1,000 frames per second may be used, with a frame period of 1 millisecond. Any of a wide variety of frame periods and frame rates may be used in different embodiments. The frame periods may also differ from one frame to the next, and for example may be shorter on an illuminated exposure frame, and longer on a subsequent unilluminated exposure frame. A frame rate of securable indicia decoding device 100C may be increased (and frame time decreased) by decreasing of a frame picture size, for example.

Each frame period may illustratively include preliminary operations to an exposure, performing the exposure itself and associated simultaneous operations, and operations after the exposure. The operations after the exposure may illustratively include any or all of a process of reading data out of image sensor 1032; providing post-exposure flicker correction illumination with imaging illumination subsystem 800; converting, storing, or buffering data in memory 1085; and processing stored or buffered frames by processor 1060, such as processing for attempting to decode a decodable indicia. In an illustrative embodiment, reading data out of image sensor 1032 and/or providing post-exposure flicker correction illumination may be performed within the post-exposure portion of a frame period, while at least part of additional steps of converting, storing, or buffering data, and processing stored or buffered data such as processing for attempting to decode a decodable indicia, may extend past the frame period of the exposure in which a frame of data was captured and after one or more subsequent frame periods have commenced.

Securable indicia decoding device 100C may be operative to change settings or states of imaging illumination subsystem 800 and imaging subsystem 900 between at least a first exposure and resulting frame of image data, and a second exposure and resulting frame of image data. The second frame may be a successive frame in relation to the first frame or a non-successive subsequent frame in relation to the first frame. The first and second frames of image data may be exposed, captured, and processed during a single trigger signal activation period and decoding session, or during separate trigger signal activation periods and decoding sessions, in different illustrative embodiments. As indicated, a read attempt may be commenced by activation of a trigger signal resulting from depression of a trigger and may be ceased by deactivation of a trigger signal resulting e.g. from a release of the trigger.

Securable indicia decoding device 100C may be used for a decoding imaging operation by a user activating an input manually, or may activate due to an automated activation signal, in different implementations. A manual input may be through a physical component, such as trigger 1220 of securable indicia decoding device 100C, that may be physically depressed, pulled, or touched, for example, or it may be a widget on a touch screen, such as display 1222 of securable indicia decoding device 100C, that is touched, or any other form of user input in various embodiments. The securable indicia decoding device 100C may then perform one or more imaging and decoding cycles on an open loop basis while the trigger activation signal is on or activated, and may end when the trigger signal stops or is no longer active, such as due to a release of a trigger, an expiration of a timeout period, or a successful decode, for example. While these illustrative examples involve manual trigger modes, various embodiments may also use automatic trigger modes.

One or more parameter determination exposures may be made prior to one or more decoding exposures of image frames for an attempted decode operation. Parameter determination exposures may be used for determining operating parameters of subsequent exposures for actually acquiring frames of image data for attempted decoding. These parameter determination exposures may be exposed and processed to determine parameters such as target distance and ambient light that are used in determining parameters such as focus and illumination duration for subsequent decoding exposures for attempted indicia decoding. The aimer subsystem 1208 of the securable indicia decoding device 100C may also be used to project an aimer illumination pattern for aiming the imaging subsystem. A decoding exposure may involve a control processor sending an imaging illumination activation signal to imaging illumination subsystem 800 and an exposure activation signal to imaging subsystem 900 at the same time, and the imaging illumination subsystem 800 of the securable indicia decoding device 100C projecting an illumination pattern at the same time that the imaging subsystem 900 of the securable indicia decoding device 100C exposes a frame of image data onto an image sensor array 1033.

A frame of image data from a decoding exposure may be downloaded from image sensor array 1033 to a data storage buffer or processor for processing for performing an attempted decode. Multiple frames of image data may be buffered at the same time, in one or more data storage buffering components, and multiple frames of image data may be processed at the same time, by one or more processors. Any subset of image data may also be independently accessed from the in-pixel data storage portions of subsets of pixels for processing a windowed frame of image data, in various embodiments using in-pixel data storage portions. Other embodiments may be used without in-pixel data storage portions. Each frame of image data may be downloaded from the image sensor array 1033, to a buffer or directly to a processor, at the end of the exposure period in which it is acquired. This may be followed by performing an attempted decode on at least one of the frames of image data. One or more frames of image data may be analyzed at the same time, by one or more processors, in the attempt to decode an indicia from at least one of the frames of image data.

An ongoing series of decode exposures may be brought to a conclusion after a successful decode of a target indicia, in an illustrative embodiment. The step of attempting to decode an indicia may continue running in parallel with ongoing operation of acquiring new exposures; and attempting to decode an indicia may continue operating on multiple frames of image data at the same time, using multiple exposure frames, until an indicia is decoded in any one of the frames, in various embodiments.

Either one or several decoding exposures may be performed by a securable indicia decoding device 100C. A securable indicia decoding device 100C may be set to perform a certain number of decoding exposures, unless it decodes an indicia before the set number is finished and stops early; or a securable indicia decoding device 100C may be set to continue performing decoding exposures on an open-ended basis until an indicia decode occurs, and then stop; or a securable indicia decoding device 100C may be set to continue performing decoding exposures on an ongoing open-ended basis after one or more indicia decodes occur, in various settings or implementations. Different operational settings such as these may be determined by a user input, or may be set by a default or an automated process in different illustrative implementations. In an illustrative embodiment, securable indicia decoding device 100C may be operative so that securable indicia decoding device 100C may be configured for any of several optional operating modes via menu selections, or by an XML based configuration file, for example. The XML file may be edited using an appropriate editor of a software development kit (SDK) that may be sold with securable indicia decoding device 100C, offered for download on a website, or otherwise made available, in different illustrative embodiments. A configuration file may contain several sections, each of which may contain keys that define operational parameters for imaging and performing attempted decodes on decodable features. Securable indicia decoding device 100C may be operative so that different configuration options are displayed on a menu on display screen 1222. A user interface of securable indicia decoding device 100C may also be provided by configuring securable indicia decoding device 100C to be operative to be reprogrammed by decoding of programming barcode symbols, that may be scanned and decoded by securable indicia decoding device 100C where the decoded information is received as programming instructions for the securable indicia decoding device 100C.

The capability for the pixels to be instructed to begin an exposure simultaneously and end an exposure simultaneously and for each pixel to store its own data in its own in-pixel data storage portion enables the use of an electronic simultaneous shutter instead of a traditional rolling shutter. The simultaneous shutter is capable of simultaneously exposing all or substantially all or a subset of the pixels in the two-dimensional array. In one embodiment, an electronic simultaneous shutter control module includes a timing module. The row and column address and decode module is used to select particular pixels for various operations such as collection activation, electronic simultaneous shutter data storage and data read-out. A read-out module may organize and process the reading out of data from the sensor array. In various embodiments, the sensor array control module may also include a rolling shutter control module that is capable of sequentially exposing and reading out the lines of pixels in the image sensor array.

Processing the electric signal within the pixels, such as measured in charge resulting from incident light and resulting photoexcited charge carriers, to produce image data may include, for example, amplifying the data generated from the incident radiation. The processing may further include storing the generated image data values in the in-pixel data storage portion of each of the plurality of pixels. The process may additionally includes reading out and processing the stored image data values from the plurality of pixels. The processing may include amplifying the data generated from the incident radiation and converting the generated data into a digital signal. The processing may also include storing a set of digital signal values corresponding to incident light on the plurality of pixels of image sensor array module 182 as a frame of image data. Securable indicia decoding device 100C may store into a memory module a frame of image data including a plurality of N-bit (grey scale) pixel values, each pixel value representing light incident at one of the plurality of pixels, in one illustrative embodiment. In one embodiment, the reading out of the plurality of pixels is controlled by a read-out timing control pulse generated by the read-out module of the sensor array control module. In one embodiment, the read-out timing control pulse includes a plurality of pulses transmitted to each of the plurality of pixels. In one embodiment, at least a portion of the illumination control timing pulse occurs during the exposure control timing pulse. In one such embodiment, the operation of the image collection module including the sensor array control module with the global electronic shutter control module is coordinated with the operation of the illumination module including the illumination control module by the control module to achieve the overlap in the illumination and exposure control timing signals. In various embodiments, the securable indicia decoding device 100C is capable of operating in either a rolling shutter mode or a simultaneous shutter mode. In one such embodiment, the rolling shutter mode is used as part of an automatic focusing operation and the global electronic shutter mode is used to collect image data once the proper focus has been determined.

Many functions of electrical and electronic apparatus may be implemented in hardware (for example, hard-wired logic), in software (for example, logic encoded in a program operating on a general purpose processor), and/or in firmware (for example, logic encoded in a non-volatile memory that is invoked for operation on a processor as required). One implementation of hardware, firmware and software may be substituted for another implementation of the equivalent functionality using a different one of hardware, firmware and software. To the extent that an implementation can be represented mathematically by a transfer function, for example, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, may be included herein.

A small sample of illustrative devices, systems, and apparatuses that are described herein are as follows according to various illustrative embodiments (none of which are necessarily exclusive of other embodiments or other aspects of various embodiments as disclosed above):

Embodiment 1. A securable indicia decoding device comprising:
an imaging subsystem comprising an image sensor array and an imaging optics assembly operative for focusing an image onto the image sensor array;
a memory capable of storing frames of image data comprising data communicated through the read-out portion of at least some of the pixels during the imaging operation;
a processor operative for receiving one or more of the frames of image data from the data storage element and performing a decode operation for attempting to decode a decodable feature represented in at least one of the frames of image data; and
a housing encapsulating the illumination subsystem and the imaging subsystem, the housing comprising a lock receiving portion for receiving a security lock.

Embodiment 2. The securable indicia decoding device of embodiment 1, wherein the lock receiving portion comprises a lock receiving slot.

Embodiment 3. The securable indicia decoding device of embodiment 2, wherein the lock receiving slot is shaped to allow passage of a portion of a security lock through the lock receiving slot 113.

Embodiment 4. The securable indicia decoding device of embodiment 3, wherein the lock receiving slot is shaped to allow passage of a T-shaped locking beam and side braces comprised in a security lock through the lock receiving slot.

Embodiment 5. The securable indicia decoding device of embodiment 2, wherein the lock receiving portion further comprises a depression on a portion of the housing, and wherein the lock receiving slot is positioned in the depression.

Embodiment 6. The securable indicia decoding device of embodiment 5, wherein the lock receiving portion further comprises a seal plug configured to alternately fit conformingly over the lock receiving slot, and to be extended and rotated out of the way of the lock receiving slot.

Embodiment 7. The securable indicia decoding device of embodiment 6, wherein the seal plug is retractably and rotatingly mounted in the depression.

Embodiment 8. The securable indicia decoding device of embodiment 6, wherein the seal plug comprises a protruding nub, and the protruding nub is shaped to fit conformingly within the lock receiving slot.

Embodiment 9. The securable indicia decoding device of embodiment 2, wherein the housing comprises an upper housing portion and a lower housing portion that conformingly fit together.

Embodiment 10. The securable indicia decoding device of embodiment 2, further comprising an output element for providing decoded information as decoded by the processor.

Embodiment 11. The securable indicia decoding device of embodiment 2, further comprising an illumination subsystem operative for projecting an illumination pattern.

Embodiment 12. The securable indicia decoding device of embodiment 2, further comprising a monitor positioned on the upper housing portion.

Embodiment 13. The securable indicia decoding device of embodiment 2, further comprising a keypad positioned on the upper housing portion.

Embodiment 14. A securable indicia decoding device system comprising a securable indicia decoding device and a security lock, wherein the securable indicia decoding device comprises:
an imaging subsystem comprising an image sensor array and an imaging optics assembly operative for focusing an image onto the image sensor array;
a memory capable of storing frames of image data comprising data communicated through the read-out portion of at least some of the pixels during the imaging operation;
a processor operative for receiving one or more of the frames of image data from the data storage element and performing a decode operation for attempting to decode a decodable feature represented in at least one of the frames of image data; and
a housing encapsulating the illumination subsystem and the imaging subsystem, the housing comprising a lock receiving portion configured for receiving the security lock.

Embodiment 15. The securable indicia decoding device system of embodiment 14, wherein the security lock comprises side braces and a locking beam extending between and beyond the side braces.

Embodiment 16. The securable indicia decoding device system of embodiment 15, wherein the locking beam is a T-shaped locking beam.

Embodiment 17. The securable indicia decoding device system of embodiment 15, wherein the lock receiving slot is shaped to allow passage of the locking beam and the side braces through the lock receiving slot, and wherein the locking beam may be rotated between the locked state and the unlocked state by means of rotating a key mated to the security lock in a keyway of the security lock.

Embodiment 18. The securable indicia decoding device system of embodiment 15, wherein the locking beam comprises opposing ends and the lock receiving portion comprises side walls on either side of the lock receiving slot, and wherein the locking beam may be positioned in a locking position in the lock receiving slot, such that in the locking position, the opposing ends of the locking beam extend substantially orthogonally away from the lock receiving slot in an interior of the housing and are positioned adjacent the side walls on either side of the lock receiving slot, thereby resisting being pulled out through the lock receiving slot.

Embodiment 19. The securable indicia decoding device system of embodiment 18, wherein the side braces brace a base of the locking beam within the lock receiving slot.

Embodiment 20. The securable indicia decoding device system of embodiment 14, wherein the security lock comprises a flexible hardened tether extending away from the body of the security lock.

While the present invention has been described with reference to a number of specific embodiments, it will be understood that the scope of the invention is not limited to any particular embodiments or combination of embodiments or elements discussed above or depicted in the figures. Further, while in numerous cases herein wherein devices, systems, apparatuses, or methods are described as having a certain number of elements, it will be understood that such devices, systems, apparatuses, or methods may be practiced with fewer than or greater than the illustratively indicated certain number of elements. For example, where any claimed embodiment may recite a feature or at least one feature, that embodiment may also comprise more than one of that feature. Also, while a number of particular embodiments have been described, it will be understood that features and aspects that have been described with reference to each particular embodiment may be used in any combination with features and aspects of any other embodiment.

What is claimed is:

1. A securable indicia decoding device comprising:
    an imaging subsystem comprising an image sensor array and an imaging optics assembly operative for focusing an image onto the image sensor array;
    a memory capable of storing frames of image data comprising data communicated through the read-out portion of at least some of the pixels during the imaging operation;
    a processor operative for receiving one or more of the frames of image data from the data storage element and performing a decode operation for attempting to decode a decodable feature represented in at least one of the frames of image data; and
    a housing encapsulating the illumination subsystem and the imaging subsystem, the housing comprising a lock receiving portion for receiving a security lock;
    wherein the lock receiving portion comprises:
        a lock receiving slot shaped to allow passage of a T-shaped locking beam; and
        side braces comprised in the security lock through the lock receiving slot.

2. The securable indicia decoding device of claim 1, wherein the lock receiving portion further comprises a depression on a portion of the housing, and wherein the lock receiving slot is positioned in the depression.

3. The securable indicia decoding device of claim 2, wherein the lock receiving portion further comprises a seal plug configured to alternately fit conformingly over the lock receiving slot, and to be extended and rotated out of the way of the lock receiving slot.

4. The securable indicia decoding device of claim 3, wherein the seal plug is retractably and rotatingly mounted in the depression.

5. The securable indicia decoding device of claim 3, wherein the seal plug comprises a protruding nub, and the protruding nub is shaped to fit conformingly within the lock receiving slot.

6. The securable indicia decoding device of claim 1, wherein the housing comprises an upper housing portion and a lower housing portion that conformingly fit together.

7. The securable indicia decoding device of claim 1, further comprising an output element for providing decoded information as decoded by the processor.

8. The securable indicia decoding device of claim 1, further comprising an illumination subsystem operative for projecting an illumination pattern.

9. The securable indicia decoding device of claim 1, further comprising a monitor positioned on the upper housing portion.

10. The securable indicia decoding device of claim 1, further comprising a keypad positioned on the upper housing portion.

11. The securable indicia decoding device of claim 1, wherein the security lock is a tethered security lock.

12. The securable indicia decoding device of claim 1, wherein the T-shaped locking beam is rotatable between a locked state and an unlocked state by rotating a key mated to the security lock.

13. A securable indicia decoding device system comprising a securable indicia decoding device and a security lock, wherein the securable indicia decoding device comprises:
    an imaging subsystem comprising an image sensor array and an imaging optics assembly operative for focusing an image onto the image sensor array;
    a memory capable of storing frames of image data comprising data communicated through the read-out portion of at least some of the pixels during the imaging operation;
    a processor operative for receiving one or more of the frames of image data from the data storage element and performing a decode operation for attempting to decode a decodable feature represented in at least one of the frames of image data; and
    a housing encapsulating the illumination subsystem and the imaging subsystem, the housing comprising a lock receiving portion configured for receiving the security lock;
    wherein the security lock comprises side braces and a locking beam extending between and beyond the side braces.

14. The securable indicia decoding device system of claim 13, wherein the locking beam is a T-shaped locking beam.

15. The securable indicia decoding device system of claim 13, wherein the lock receiving slot is shaped to allow passage of the locking beam and the side braces through the lock receiving slot, and wherein the locking beam may be rotated between the locked state and the unlocked state by means of rotating a key mated to the security lock in a keyway of the security lock.

16. The securable indicia decoding device system of claim 13, wherein the locking beam comprises opposing ends and the lock receiving portion comprises side walls on either side of the lock receiving slot, and wherein the locking beam may be positioned in a locking position in the lock receiving slot, such that in the locking position, the opposing ends of the locking beam extend substantially orthogonally away from the lock receiving slot in an interior of the housing and are positioned adjacent the side walls on either side of the lock receiving slot, thereby resisting being pulled out through the lock receiving slot.

17. The securable indicia decoding device system of claim 16, wherein the side braces brace a base of the locking beam within the lock receiving slot.

18. The securable indicia decoding device system of claim 13, wherein the security lock comprises a flexible hardened tether extending away from the body of the security lock.

19. The securable indicia decoding device system of claim 13, wherein the security lock is a tethered security lock.

20. The securable indicia decoding device system of claim 13, wherein the locking beam is rotatable between a locked state and an unlocked state by rotating a key mated to the security lock.

* * * * *